United States Patent [19]

Druker et al.

[11] 4,150,996

[45] Apr. 24, 1979

[54] LITHOGRAPHIC FOUNTAIN CONCENTRATE

[75] Inventors: Leonard J. Druker, St. Paul; Robert B. Kincaid, Bloomington, both of Minn.

[73] Assignee: Minnesota Mining and Manufacturing Company, St. Paul, Minn.

[21] Appl. No.: 822,267

[22] Filed: Aug. 5, 1977

[51] Int. Cl.[2] .......... C09K 3/18

[52] U.S. Cl. .......... 106/2; 101/451; 101/465; 106/208

[58] Field of Search .......... 106/2, 208; 260/72.5; 101/451, 465

[56] References Cited

U.S. PATENT DOCUMENTS

| | | | |
|---|---|---|---|
| 2,197,357 | 4/1940 | Widmer et al. | 260/17.3 |
| 2,550,639 | 4/1951 | Dawson | 260/72.5 |

*Primary Examiner*—Lorenzo B. Hayes
*Attorney, Agent, or Firm*—Cruzan Alexander; Donald M. Sell; Gerald F. Chernivec

[57] ABSTRACT

A fountain concentrate for preparing a dampening or fountain solution for lithography, consisting essentially of a mixture of a desensitizer, sulfanilic acid, and formaldehyde.

10 Claims, No Drawings

LITHOGRAPHIC FOUNTAIN CONCENTRATE

BACKGROUND OF THE INVENTION

This invention relates to lithography, and more particularly to a sulfanilic acid-containing concentrate, which when mixed with water, provides a fountain solution for lithography.

Conventional lithography relies on the mutual incompatibility of two fluids, ink and water, in its operation to produce printed matter containing sharp images on clean backgrounds. In theory, a presensitized lithographic printing plate such as is commonly used in the industry, for example as disclosed and claimed in U.S. Pat. Nos. 3,396,019 and 3,929,591, when exposed to actinic radiation through an original transparency and developed with suitable solvents, results in an image area which is oleophilic, and therefore suitable to accept greasy, lithographic printing ink and background areas which are hydrophilic in character and capable of accepting water, or more generally, an aqueous, acidic fountain solution to thereby resist the presence of ink in such background areas of the printing plate.

Rather narrow operating conditions typically prevail on a lithographic press between the relative amounts of ink and fountain solution utilized so that the printed sheet shows no evidence of ink in the background areas, but yet densely reproduces the colors of the original subject matter in image areas. For example, excess fountain solution, or, an improperly prepared solution, may cause blinding of the oleophilic regions of the plate, thereby resulting in a washed out or weak-looking print. Conversely, insufficient fountain solution covering the background areas of the plate may cause "catch-up", toning, or scumming of the background areas.

Similarly, the pH of the fountain solution must be relatively specific for trouble-free operation. If the pH number is too low, there can occur, among other conditions, ink emulsification, tinting, scumming, snow flaking, rapid plate wear, and slow ink drying. If the pH number is high, it is possible to have sensitivity in the background areas, emulsification, half tone plugging, and dirty dampeners. In most instances, a pH range of from about 3.5 to about 5.0 has been determined to be most commonly used, with a mid-range value of about 4.0 being the general target.

In addition to problems relating to the lithographic printing plate itself, there can exist conditions related to the press function whereby a phenomena called "ink stripping" may occur. This deficiency may be caused by the fountain solution ingredients forming a film on the metal rollers of the press and thereby preventing the ink from being transferred from one roll to the adjacent roll in the ink train. For example, when there is too much acid in the fountain solution, this ink stripping may occur, or if gum arabic is used as the desensitizer, acidic gum may coat the roller surfaces making them hydrophilic in character, as opposed to oleophilic.

These and other problems have been recognized by experts in the lithographic field and many procedures have been attempted to minimize adverse effects. For example when the lithographic support or base consists of an aluminum substrate with an anodized coating thereon, which typically represents the hydrophilic background region after image development, a subbing layer may be provided which contains a hydrophilic cellulosic compound and a metal salt over which can be coated a layer of actinic radiation-sensitive polymer composition, as is taught in British Pat. No. 1,442,760.

Furthermore, British Pat. No. 1,414,575 discloses subbing compositions exhibiting extremely high ink-/water differential between the image and non-image areas so as to assist in prevention of scumming on "roll-up" or subsequent use of the plate.

In addition to treatment of the printing plate itself to prevent scumming, blinding, etc., considerable effort has been expended to prepare desensitizer formulations which would maintain the ink/water differential on a lithographic plate surface during press operation. U.S. Pat. No. 3,738,850 discloses the addition of dialdehydes to desensitizer formulations so that the plate has less tendency to scum, particularly after the developed plate has been stored for a period of time.

The acidic pH-adjusting component of conventional fountain solution is phosphoric acid. Phosphoric acid, aside from toxicity of waste materials, has been thought to induce detrimental problems in the printing process, typically through the lack of control of the concentration utilized by the press operator. If this acid is used in excess in the fountain solution, the cobalt driers conventionally contained in lithographic ink can be adversely affected, such that the drying of the ink on the printed sheet becomes retarded. Such insufficient drying results in ink "setting off" to the next adjacent sheet in the stacker.

In the case of anodized aluminum substrates, the resin image areas thereon are subject to undercutting, flaking and subsequent removal in the printing operation when strong concentrations of phosphoric acid are utilized in the fountain solution. Furthermore, it has been reported that phosphoric acid may operate in a deleterious fashion on the anodized aluminum surface itself to soften the structure and in fact cause the plate to become sensitized, i.e., the background areas of the plate pick up ink in isolated, discrete spots, which results in ink toning on the background areas of the printed sheet.

It has now been found that by utilizing sulfanilic acid as the acidic component of the fountain solution, excellent results can be obtained. Furthermore, by utilizing sulfanilic acid, a reduced amount of the hydrophilic colloid or desensitizer typically contained in fountain solutions, e.g., gum arabic, can be utilized, which affords minimizing of plate blinding on the press. Furthermore, sulfanilic acid is not toxic nor is it a pollutant which provides for better waste control of the dampening solution.

SUMMARY OF THE INVENTION

In accordance with the invention, there is provided a concentrate suitable for preparing a fountain solution for lithography, the concentrate consisting essentially of a mixture of a desensitizer, sulfanilic acid, and formaldehyde. The sulfanilic acid and formaldehyde have been found to react at room temperature, preferably in the presence of a minor amount of an alkaline material, to provide a reaction product which is acidic and has substantially greater solubility in water than sulfanilic acid alone.

The use of sulfanilic acid for fountain solution pH control affords superior press functioning and non-toxic and non-polluting waste materials.

Detailed Description of the Invention

The fountain solution of the invention is based on the use of sulfanilic acid (para-aminobenzenesulfonic acid).

While sulfanilic acid itself can be utilized in a fountain concentrate, which can later be mixed with water by the press operator, its solubility in water is so slight that a rather large amount of concentrate is necessary to achieve the proper functionality of the fountain solution.

It has been ascertained that sulfanilic acid formaldehyde will react at room temperature, preferably in the presence of a base, such as sodium hydroxide. This reaction results in a significant increase in the solubility of the acid.

The probable reaction involves the condensation reaction of the aryl amine or aniline group with formaldehyde to yield a highly colored product. In this reaction, the sulfanilic acid groups are available as free acid groups and thereby can provide the adjustment of pH values necessary to afford suitable press performance. The reaction is accelerated at room temperature by the addition of a minor amount of an alkaline material, e.g., sodium hydroxide, to the mixture. It has been found that by utilizing equal weights of aqueous formaldehyde, i.e., formalin, and sulfanilic acid, concentrations of up to 65% by weight in water can be obtained.

A preferred formula for the stock concentrate solution, which may then be simply diluted with water to form the fountain solution for use on the lithographic press is provided in the following example, wherein all parts are by weight.

EXAMPLE I

To prepare the preferred fountain concentrate of the invention, 17 parts of sulfanilic acid were mixed with 17 parts of formalin (which is a 37 percent by weight aqueous formaldehyde solution) containing 0.5 parts sodium hydroxide therein, until the entire amount of acid was in solution. To this were added 15.8 parts of gum arabic, a desensitizer, which dissolved in the reaction mixture, 9 parts of magnesium nitrate, and 40.7 parts of water.

A desensitizer is a material, hydrophilic in nature, which is capable of adhering to the background surfaces of a plate, e.g., aluminum, the hydrophilicity thereof then imparting the necessary functionality to these background areas. Typical desensitizers are hydrophilic colloids, an example of which is gum arabic. When gum arabic is placed in the presence of an acid, the acidified gum arabic provides for an excellent desensitizer, and is preferred for use in the concentrate of the invention.

The magnesium nitrate is commonly used as an aid in desensitizing exposed aluminum surfaces on a conventional printing plate.

The proportional parts of the concentrate formula can be altered to adjust for the quality of water in existence in a particular geographical area so as to provide a concentration range of sulfanilic acid extending from about 3 percent to about 28 percent by weight. In this manner, geographic locations wherein high amounts of carbonate and other minerals are contained in the local waters can utilize modified concentrations so as not to reduce the effectiveness of the sulfanilic acid-based desensitizer solution.

In areas where the local water supply has a relatively low mineral content, it has been found that by utilizing as little as 1/3 of an ounce of the concentrate per gallon of water can provide an excellent desensitizing solution. The pH of this fountain solution was measured at 4.0, and under these conditions the solution can provide sufficient protection for a lithographic plate to be press run over extended periods of time without evidence of background scum. The gum arabic contained in the fountain solution at this fountain concentrate level is less than the amount conventionally used in fountain solutions, and yet is capable of providing sufficient protection for the background areas of the printing plate without evidence of image blinding.

In geographical locations, such as for example Houston, Tex., where the water supply is high in minerals, salts, and alkalies, it is necessary to increase the amount of concentrate in the total solution. At a level of 1.5 ounces per gallon of water in such a location, press tests have demonstrated that the background areas of lithographic printing plates remain clean on the press and that there are no deleterious influences on other press functions.

What is claimed is:

1. A fountain concentrate which when diluted with water is capable of providing an acidic fountain solution for lithography, said concentrate consisting essentially of a mixture of sulfanilic acid, formaldehyde, and a desensitizer.

2. The concentrate of claim 1 further including a minor amount of a water-soluble alkaline material.

3. The concentrate of claim 2 wherein said alkaline material is sodium hydroxide.

4. The concentrate of claim 1 wherein said desensitizer is a hydrophilic colloid.

5. The concentrate of claim 4 wherein said colloid is gum arabic.

6. A fountain solution for lithography, said fountain solution having a pH of from about 3.5 to about 5.0 and consisting essentially of a mixture of sulfanilic acid, formaldehyde, water, and a desensitizer.

7. The fountain solution of claim 6 wherein said desensitizer is a hydrophilic colloid.

8. The fountain solution of claim 7 wherein said colloid is gum arabic.

9. The fountain solution of claim 6 further including a minor amount of a water-soluble alkaline material.

10. The fountain solution of claim 9 wherein said alkaline material is sodium hydroxide.

* * * * *